United States Patent [19]
Van Helvoirt

[11] Patent Number: 5,458,440
[45] Date of Patent: Oct. 17, 1995

[54] OFFSHORE PIPELINE SYSTEM

[75] Inventor: Laurens C. Van Helvoirt, Rijswijk, Netherlands

[73] Assignee: Shell Oil Company, Houston, Tex.

[21] Appl. No.: 217,295

[22] Filed: Mar. 23, 1994

[30] Foreign Application Priority Data

Mar. 29, 1993 [EP] European Pat. Off. .............. 93200906

[51] Int. Cl.⁶ .................................................. F16L 1/12
[52] U.S. Cl. .......................................... 405/169; 405/158
[58] Field of Search .................................. 405/158, 169, 405/170; 166/338, 341, 344, 347

[56] References Cited

U.S. PATENT DOCUMENTS 4,544,036  10/1995  Saliger .

FOREIGN PATENT DOCUMENTS 2044319  2/1980  United Kingdom .
2078891  6/1981  United Kingdom .
2163466  8/1985  United Kingdom .
90/03492  4/1990  WIPO .

*Primary Examiner*—David H. Corbin
*Attorney, Agent, or Firm*—Mark A. Smith

[57] ABSTRACT

An offshore pipeline system is provided, comprising a pipe section which is curved so as to bend upon a variation of the distance between the ends thereof. The pipe section is provided with a pair of first connectors extending in downward direction, each first connector being located at one of said ends of the pipe section. The system further comprises a pair of second connectors extending in upward direction and located at a distance relative to each other so as to allow connection of each first connector to one of said second connectors, means for lowering the pipe section through the water towards the second connectors and guide means for guiding each first connector towards one of said second connectors when the pipe section is lowered through the water so as to connect the first connectors to the second connectors.

11 Claims, 1 Drawing Sheet

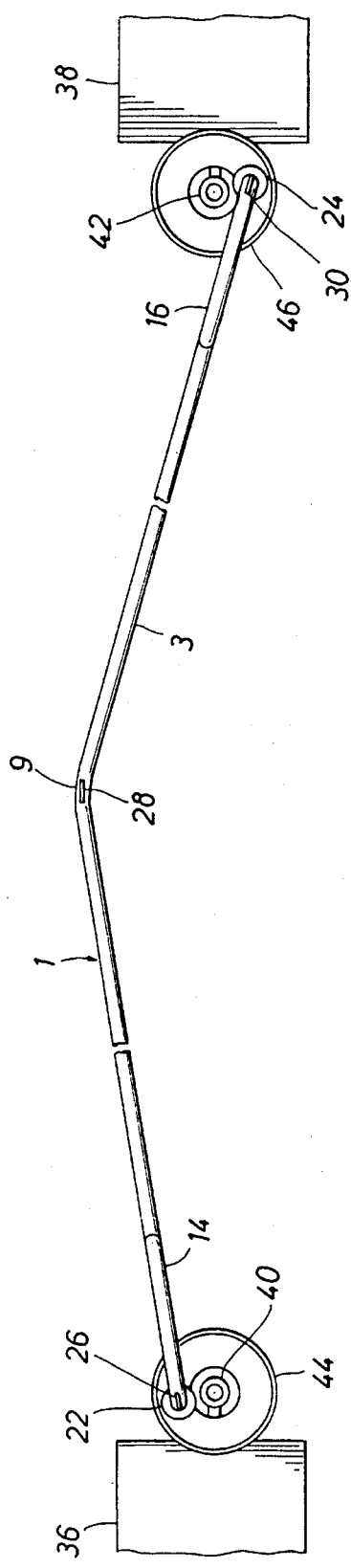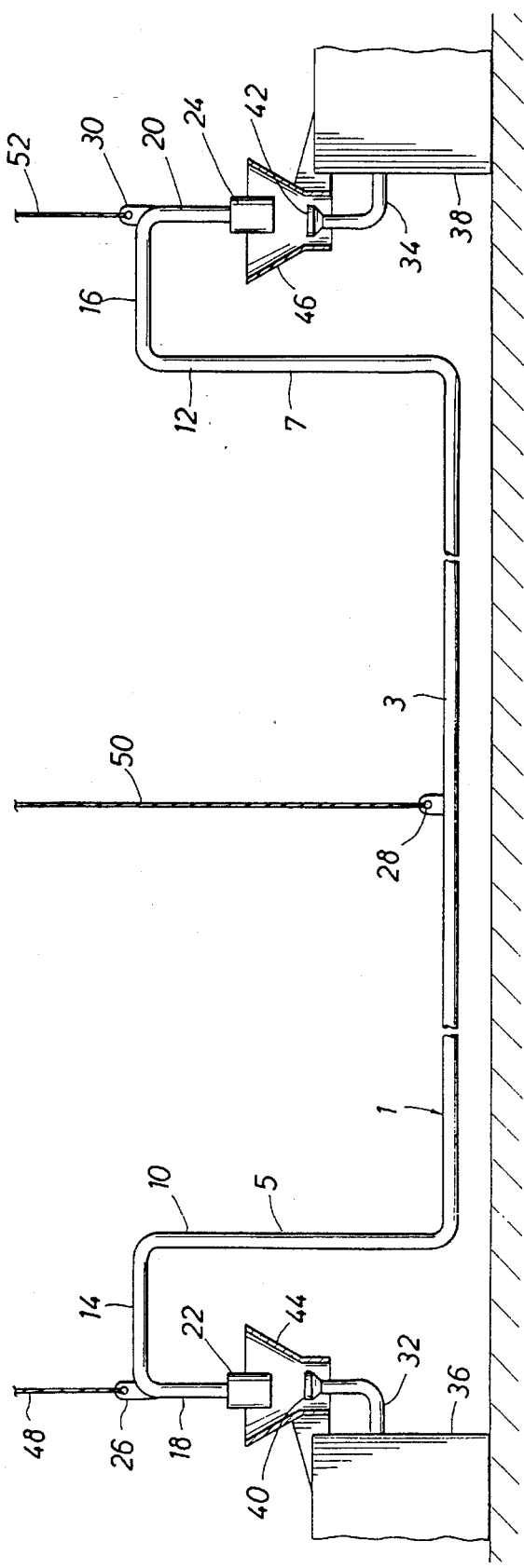

OFFSHORE PIPELINE SYSTEM

BACKGROUND OF THE INVENTION

The present invention relates to an offshore pipeline system which includes a pipe section for interconnecting different parts of the pipeline system. Interconnecting different pipeline parts located at the seabed generally involves complicated methods as in most deep-water applications diver assistance is excluded and remote controlled equipment is to be used. For example, in one method a spool piece is first connected at an end thereof to a pipeline part and laid on the seabed. Thereafter the free end of the spool piece is tied to the other pipeline part using remote controlled tying equipment, and is subsequently connected thereto. This procedure requires accurate positioning of the spool piece on the seabed prior to tying to the required connecting point in order to prevent misalignment of the spool piece relative to the pipeline to which the spool piece is to be connected.

SUMMARY OF THE INVENTION

It is an object of the invention to provide an offshore pipeline system including a pipe section for interconnecting different parts of the pipeline system, which system can easily be assembled and involves less complicated procedures than in previously applied systems.

In accordance with the invention there is provided an offshore pipeline system comprising a curved pipe section which bends upon a variation of the distance between the ends thereof, said pipe section being provided with a pair of first connectors extending in downward direction and located at opposite ends thereof, the system further comprising a pair of second connectors extending in upward direction and arranged so as to allow connection of one of the first connectors to one of the second connectors and to allow connection of the other first connector to the other second connector, means for lowering the pipe section through the water and guide means for guiding said first connectors towards said second connectors when the pipe section is lowered through the water so as to connect said one first connector to said one second connector and to connect said other first connector to said other second connector.

During assembly of the pipeline system, the pipe section is suspended from a floating vessel vertically above the pipeline parts which are to be interconnected, whereafter the pipe section is lowered through the water towards second connectors. When the pipe section is sufficiently close to the seabed, the guide means guide the first connectors towards the second connectors, whereafter upon arrival at the seabed the first connectors are connected to the respective second connectors. Any misalignment of the first connectors relative to the second connectors is compensated for by the guiding action of the guide means which induces the pipe section to bend upon a variation of the distance between the ends thereof.

Adequate bending of the pipe section upon a variation of the distance between the ends thereof is achieved when the pipe section includes a substantially horizontal part provided with a bend.

Stresses induced in the pipe section during bending thereof are reduced when the bend is located at substantially equal distances from the respective first connectors.

BRIEF DESCRIPTION OF THE DRAWINGS

The brief description above, as well as further objects, features and advantages of the present invention will be more fully appreciated by reference to the following detailed description of the preferred embodiments which should be read in conjunction with the accompanying drawings in which:

FIG. 1 shows schematically a side view of the pipeline system according to the invention; and FIG. 2 shows schematically a top view of the pipeline system of FIG. 1.

DETAILED DESCRIPTION OF PREFERRED EMBODIMENTS

The pipeline system of FIGS. 1 and 2 includes a pipe section in the form of a spool piece 1 having a horizontal section 3 provided with a bend 9, and two inverted U-shaped sections 5, 7. Each inverted U-shaped section 5, 7 consists of an inner vertical leg 10, 12, a horizontal central part 14, 16 and an outer vertical leg 18, 20. Each outer vertical leg 18, 20, is at the lower end thereof, provided with a first pipeline connector 22, 24. The spool piece 1 is provided with cable supports 26, 28, 30 of which supports 26, 30 are located at the upper ends of the outer vertical legs 18, 20 respectively, and support 28 at the bend 9 of the horizontal section 3.

The pipeline system includes furthermore two underwater pipelines 32, 34 of which only the end parts are shown. The pipelines 32, 34 are fixed to the seabed 35 by means of suitable structures 36, 38. The end parts of pipelines 32, 34 bend vertically upward and are provided with second connectors 40, 42 which are connectable to the respective first connectors 22, 24. Each end part 32, 34 is furthermore provided with a guide means in the form of a funnel 44, 46 of which the diameter decreases in downward direction, each funnel 44, 46 having its upper end located above the second connector 40, 42 of the end part 32, 34.

During installation of the pipeline system the spool piece 1 is lowered from a floating vessel by means of cables 48, 50, 52 attached to the cable supports 26, 28, 30. Upon approaching the pipelines 32, 34 the spool piece 1 is oriented using the cables 48, 50, 52 such that the first connectors 22, 24 are directed substantially vertically downward and are located vertically above the funnels 44, 46 respectively. Subsequently, the spool piece 1 is further lowered so that the first connectors 22, 24 enter the funnels 44, 46 and are guided by the inner surface of the funnels 44, 46 until the first connectors 22, 24 contact the second connectors 40, 42 and are automatically connected thereto.

If the first connectors 22, 24 are misaligned relative to the second connectors 40, 42, the guiding action of the funnels 44, 46 serves to align the first connectors 22, 24 relative to the second connectors 40, 42. Any small difference of distance between the first connectors 22, 24 and distance between the second connectors 40, 42 is compensated by bending of the spool piece 1 as the first connectors 22, 24 are guided by the funnels 44, 46 towards the second connectors 40, 42. Such bending of the spool piece 1 is allowed because of the bend 9 provided in the horizontal section 3 of the spool piece 1, and because of the inverted U-shaped sections 5, 7 at the ends thereof.

Furthermore, if the first connectors 22, 24 are not vertically aligned when approaching the second connectors 40, 42, the alignment of the first connectors 22, 24 can be corrected by controlling the tension of cable 50 relative to the tensions of cables 48, 52. For example, by increasing the tension in cable 50 while maintaining the tension in cables 48, 52 constant, the horizontal section 3 of the spool piece 1 tends to bend upward so that the angular orientation of the first connectors 22, 24 changes. Conversely, by decreasing the tension of cable 50 the angular orientation of the first connectors 22, 24 changes in opposite direction.

It is noted that modifications, changes and substitutions are intended in the foregoing disclosure. Further, in some instances, some features of the present invention will be employed without a corresponding use of other features described in these preferred embodiments. Accordingly, it is appropriate that the appended claims be construed broadly and in a manner consistent with the spirit and scope of the invention.

What is claimed is:

1. An offshore pipeline system comprising a curved pipe section which bends upon a variation of the distance between the ends thereof, said pipe section being provided with a pair of first connectors extending in downward direction and located at opposite ends thereof and a substantially horizontal part provided with a bend, the system further comprising a pair of second connectors extending in upward direction and arranged so as to allow connection of one of the first connectors to one of the second connectors and to allow connection of the other first connector to the other second connector, means for lowering the pipe section through the water and into position located at or near each end of the pipe section and at or near said bend and guide means for guiding said first connectors towards said second connectors when the pipe section is lowered through the water so as to connect said one first connector to said one second connector and to connect said other first connector to said other second connector.

2. The pipeline system of claim 1, wherein said bend is located at substantially equal distances from the respective first connectors.

3. The pipeline system of claim 1, wherein the pipe section includes at least one vertical loop in the form of an inverted U-shaped part, each inverted U-shaped part being located adjacent one of the ends of the pipe section.

4. The pipeline system of claim 3, wherein the pipe section includes two inverted U-shaped parts located at opposite ends thereof.

5. The pipeline system of claim 1, wherein said guide means form a pair of funnels, each funnel being arranged at a fixed distance above one of said second connectors.

6. The pipeline system of claim 4, wherein said guide means form a pair of funnels, each funnel being arranged at a fixed distance above one of said second connectors.

7. An offshore pipeline system comprising:
 a curved pipe section which bends as a function of the distance between the ends thereof, said curved pipe section having a substantially horizontal part provided with a bend and further comprising:
 a pair of connectors extending in downward direction and located at opposite ends thereof;
 a pair of second connectors extending in upward direction and arranged so as to allow connection of one of the first connectors to one of the second connectors and to allow connection of the other first connector to the other second connector; means for lowering the pipe section through the water located at or near each end of the pipe section and at or near said bend; and
 means for guiding said first connectors towards said second connectors when the pipe section is lowered through the water so as to connect said one first connector to said one second connector and to connect said other first connector to said other second connector.

8. The pipeline system of claim 7 wherein said bend is located at substantially equal distances from the respective first connectors.

9. The pipeline system of claim 7, wherein the pipe section further comprises at least one vertical loop in the form of an inverted U-shaped part, each inverted U-shaped part being located adjacent one of the ends of the pipe section.

10. The pipeline system of claim 9, wherein the pipe section has two inverted U-shaped parts located at opposite ends thereof.

11. An offshore underwater pipeline system, comprising:
 a curved pipe section having opposing ends, said curved pipe section comprising:
 a pair of inverted U-shaped parts, each located at one of opposing ends of the curved pipe section;
 a pair of downwardly extending first connectors, each located at one of the inverted U-shaped parts on one of the opposing ends of the curved pipe section;
 a substantially horizontal part between the opposing ends;
 a bend in the substantially horizontal part of the pipe section substantially equidistant between the opposing ends; and
 a plurality of lift points, having one located at least near each end and near the bend;
 pair of second connectors extending upwardly positioned in a manner for receiving the pair of first connectors;
 means for lowering the pipe section underwater attached to the pipe section at the lift points; and
 pair of funnels, each arranged above one of the second connectors, for guiding the first connectors towards the second connectors when the curved pipe section is lowered underwater so as to engage respective first and second connectors.

* * * * *